(12) United States Patent
Ohsawa (10) Patent No.: US 6,718,934 B2
(45) Date of Patent: Apr. 13, 2004

(54) BALANCER STRUCTURE FOR A V-TYPE ENGINE

(75) Inventor: Hiroshi Ohsawa, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 10/192,555

(22) Filed: Jul. 10, 2002

(65) Prior Publication Data

US 2003/0019459 A1 Jan. 30, 2003

(30) Foreign Application Priority Data

Jul. 26, 2001 (JP) ........................................ 2001-226007

(51) Int. Cl.$^7$ .............................................. F02B 75/06
(52) U.S. Cl. .................................. 123/192.2; 123/54.4
(58) Field of Search .............................. 123/192.2, 54.4, 123/54.5, 54.6, 54.7, 54.8

(56) References Cited

U.S. PATENT DOCUMENTS 4,480,607 A * 11/1984 Tsai et al. ................ 123/192.2
5,657,728 A * 8/1997 Diggs ....................... 123/192.2

FOREIGN PATENT DOCUMENTS

| JP | 63-125840 | 5/1988 |
| JP | 4290639 | 10/1992 |

* cited by examiner

Primary Examiner—Noah P. Kamen
(74) Attorney, Agent, or Firm—Flynn, Thiel, Boutell & Tanis, P.C.

(57) ABSTRACT

A balancer shaft is positioned on the center plane which divides cylinder banks of a V-type engine and which passes through an axis of the crankshaft, and is positioned directly below the crankshaft, whereby the balancer shaft is in close proximity to the crankshaft to cancel vibration forces.

17 Claims, 6 Drawing Sheets

BALANCER STRUCTURE FOR A V-TYPE ENGINE

FIELD OF THE INVENTION

This invention relates to a balancer structure for a V-type engine, and more particularly to a balancer structure for a V-type engine in which a balancer shaft is arranged in closest proximity to a crankshaft which is a source of vibration, so that inertial couple-forces are effectively canceled to reduce vibration.

BACKGROUND OF THE INVENTION

Some V-type engines have first and second cylinder banks defining a banking angle of 60 degree or 90 degree therebetween. A 60-degree V8-cylinder engine, that is a 60 degree banking angle and four cylinders in each cylinder bank, is not generally used as compared to a 90-degree V8-cylinder engine having a banking angle set at 90 degree and four cylinders in each cylinder bank. This is due to the fact that in the 90-degree V8-cylinder engine primary and secondary inertial forces or couple forces are well balanced by optimally setting a counterweight of a crankshaft, while in the 60-degree V8-cylinder engine primary inertial couple forces remain as residual unbalance.

One system, in which the balancer shaft cancels the vibration occurring from inertial force or couple forces in the crank system, is a balancer structure for a V-type engine having a balancer shaft in parallel with a crankshaft. This balancer structure for the V-type engine cancels vibration by rotating the balancer shaft in synchronization with the crankshaft and in a normal or reverse direction therewith, so that the primary and secondary inertial forces or inertial couple forces are balanced. Examples of such balancer structures for the V-type engine are disclosed in Japanese Laid-Open Patent No. 4-290639 and Japanese Laid-Open Patent No. 63-125840.

According to Japanese Laid-Open Patent No. 4-290639, a V-type engine includes a single balancer shaft in parallel with a crankshaft and having an eccentric weight. The balancer shaft toward the front of the engine which is rotated by the crankshaft, is disposed below the crankshaft and toward the side of the engine where fewer auxiliary machineries are installed. An oil pump driven through the balancer shaft is disposed toward the above-mentioned side in an oil pan below the balancer shaft. An oil filter is also arranged toward the above side.

According to Japanese Laid-Open Patent No. 63-125840, a V-type engine with eight cylinders has a banking angle set at an angle of 60 degree. A single balancer shaft rotates in the same direction as the crankshaft at a speed twice as fast as that of the crankshaft. The balancer shaft has the rotating axis thereof eccentrically (i.e. sidewardly) offset from the center axis of the crankshaft. Accordingly, rolling moment created by the piston pressure is reduced.

As previously mentioned, the 60-degree V8-cylinder engine is not generally used, since in the 90-degrees V8-cylinder engine primary and secondary inertial forces or couple forces are well balanced by optimally setting a counterweight of a crankshaft, while in the 60-degree V8-cylinder engine primary inertial couple forces remain as residual unbalance.

Some 60-degree V8-cylinder engines have a balancer structure including a balancer shaft which is driven by a chain and the like in a space between the cylinder banks to cancel or reduce the inertial couple forces. However, in the balancer structure having the balancer shaft in the space between cylinder banks, the balancer shaft is disposed away from the crankshaft which generates the vibration. Accordingly, it is not adequate for canceling the forces to a sufficient degree, so that the vibration cannot be reduced effectively.

In addition, since the balancer shaft is disposed away from the crankshaft which generates the vibration in this balancer structure for the V-type engine, and the couple forces are proportional to the distance therebetween, the balancer shaft is required to be heavier in proportion to the distance. Also, the larger and heavier balancer shaft as positioned away from the crankshaft and the larger space for mounting the balancer shaft result in a larger and heavier V-type engine.

In order to obviate or minimize the above problem, the present invention provides a balancer structure for a V-type internal combustion engine having a balancer shaft supported in parallel with a crankshaft. The balancer shaft is positioned on the center plane which divides the cylinder banks of the V-type engine and which passes through an axis of the crankshaft, and is positioned directly below the crankshaft.

According to the present invention, the balancer shaft is positioned on the center plane which divides the cylinder banks of the V-type engine and which passes through the axis of the crankshaft, and is positioned directly below the crankshaft. The balancer shaft can be positioned closer to the crankshaft generating vibration to shorten the distance between the crankshaft and the balancer shaft.

BRIEF DESCRIPTION OF THE DRAWINGS

FIGS. 6A and 6B show a balancer structure for a V-type engine according to a second embodiment, wherein

FIGS. 7A and 7B show a balancer structure for a V-type engine according to a third embodiment, wherein

DETAILED DESCRIPTION

The present invention will now be described in specific detail with reference to FIGS. 1–5 which illustrate a first embodiment of this invention.

Figure 1:
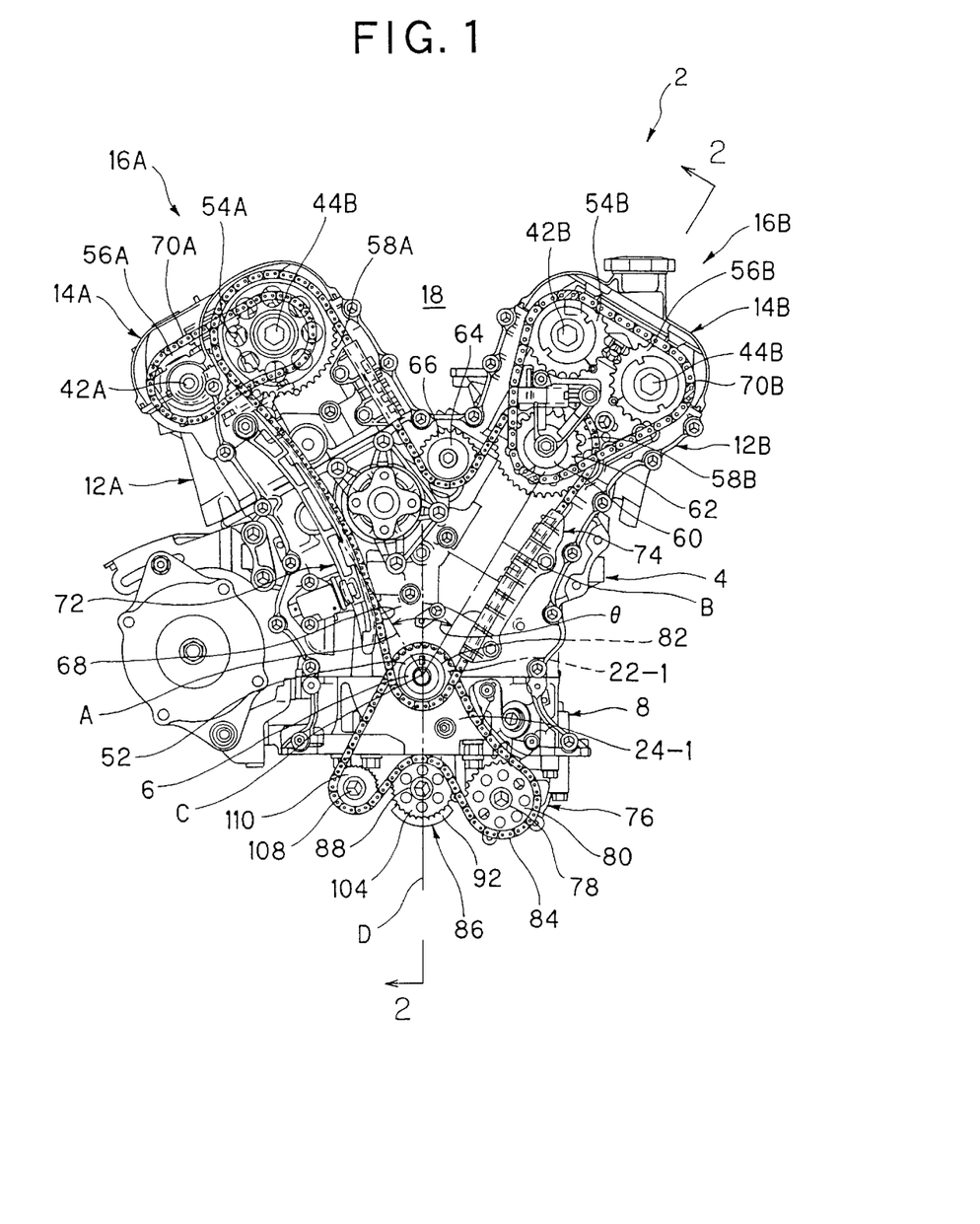
FIG. 1 is a front view of a balancer structure for a V-type engine according to a first embodiment of the invention.
Figure 2:
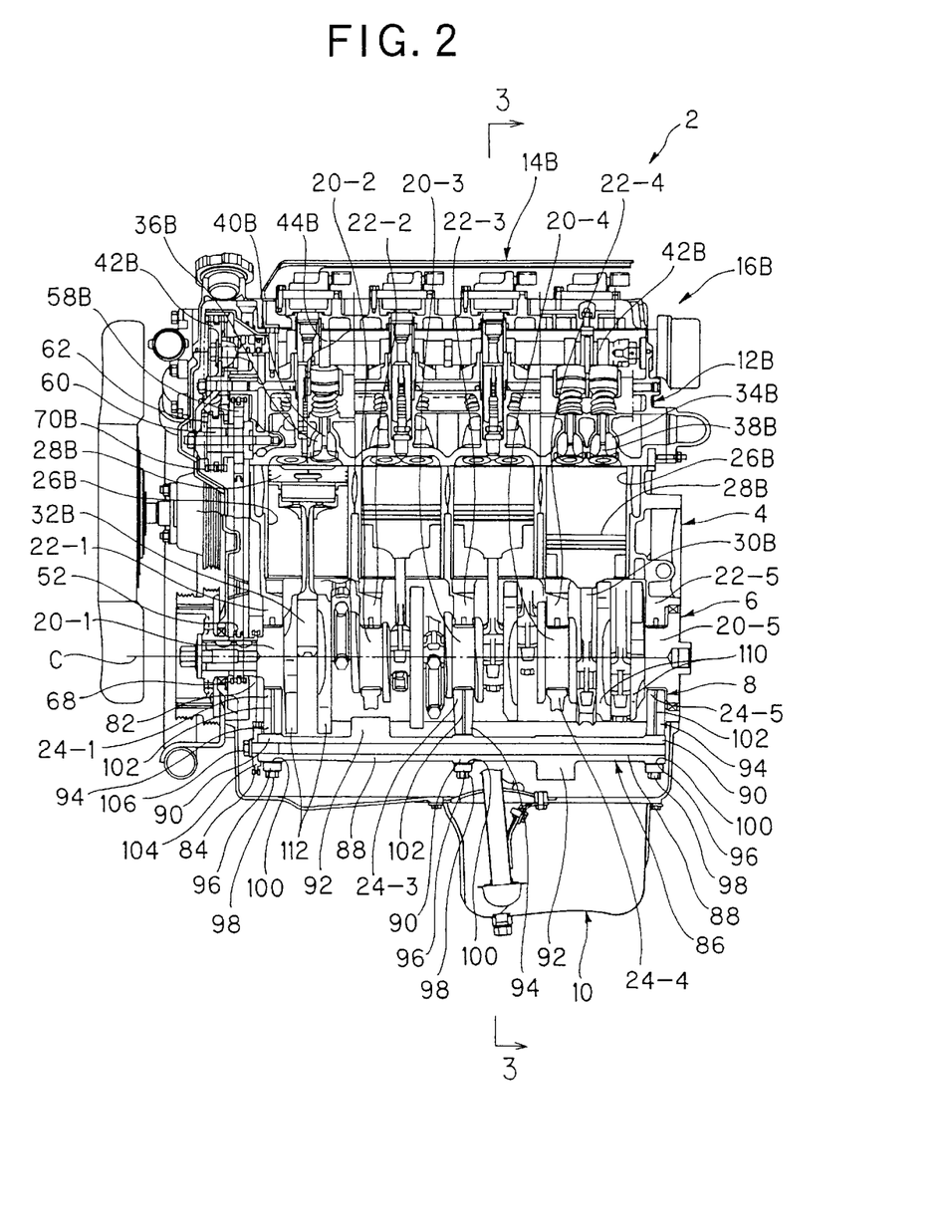
FIG. 2 is a cross-sectional view taken along line 2—2 of FIG. 1.
Figure 3:
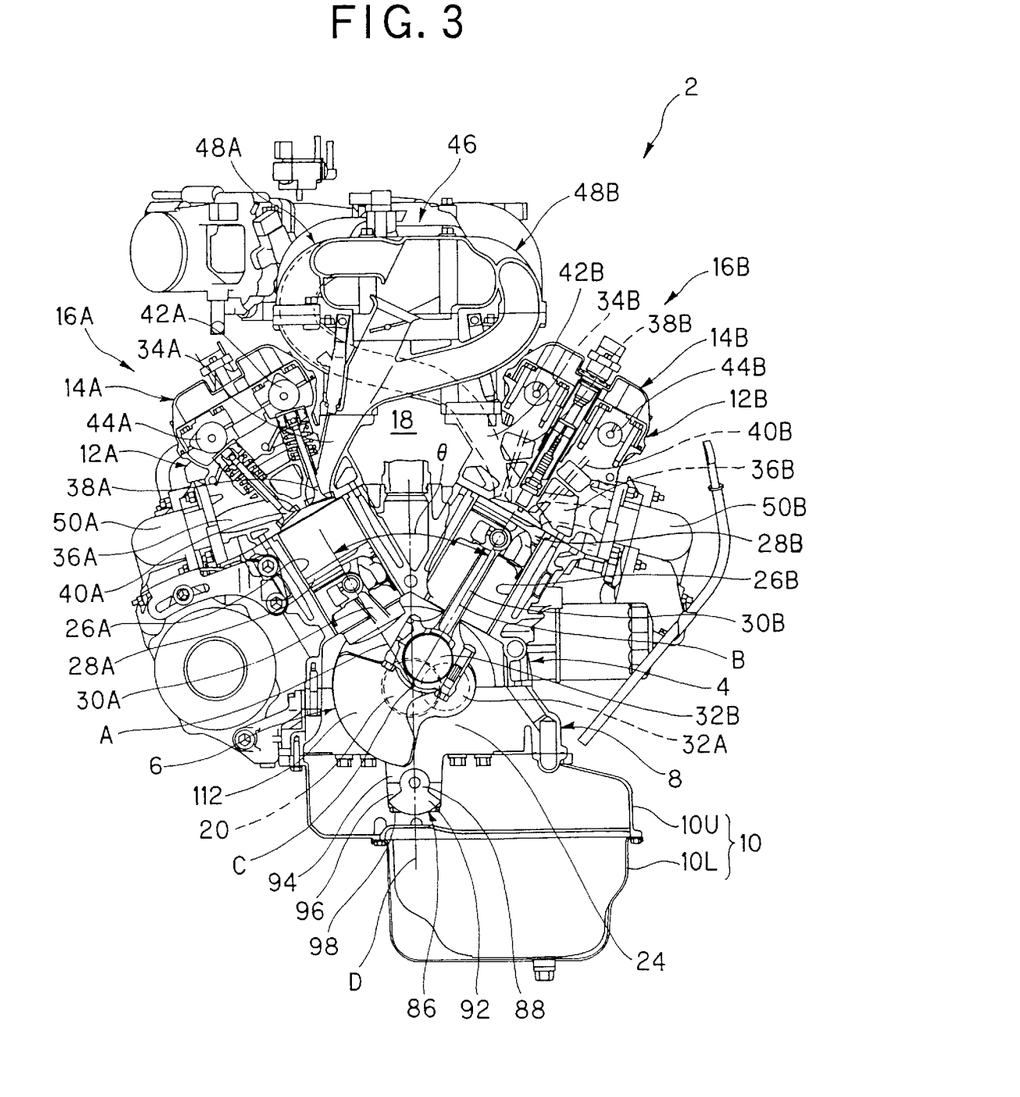
FIG. 3 is a cross-sectional view taken along line 3—3 of FIG. 2.

Referring to FIGS. 1–3, a V-type combustion engine 2 has a crankshaft 6 supported by a crankcase 8 below generally V-shaped cylinder blocks 4. An oil pan 10 is fitted to the bottom of the crankcase 8.

As shown in FIG. 3, the V-type engine 2 comprises first and second cylinder heads 12A, 12B mounted to the top of the cylinder block 4. First and second head covers 14A, 14B are mounted on the cylinder heads 12A, 12B to define first and second cylinder banks 16A, 16B disposed in a V-shape. A space 18 is defined between the cylinder banks 16A, 16B.

The V-type engine 2 comprises in a lower part of the cylinder block 4 a plurality of block-side shaft supporters 22 which support crank journals 20 for the crankshaft 6. A plurality of crankshaft supporters 24 are disposed correspondingly to the block-side shaft supports 22 which support the crank journals 20.

As shown in FIG. 2, in the V-type engine 2 of this embodiment, first through fifth block-side shaft supporters 22-1 through 22-5 are arranged along a crankshaft axis "C" in the lower part of the cylinder block 4 to support first through fifth crank journals 20-1 through 20-5. First through fifth crankshaft supporters 24-1 through 24-5 are disposed correspondingly to the supporters 22, respectively, in the crankcase 8 to support the crank journals 20.

The oil pan 10 below the crankcase 8 comprises an upper pan part 10U attached to the lower part of the crankcase 8, and a lower pan part 10L mounted to the upper part 10U.

The cylinder blocks 4 have on the first cylinder bank 16A four first cylinders 26A, and on the second cylinder bank 16B four second cylinders 26B in series. The cylinders 26A, 26B have first and second slidable pistons 28A, 28B therein, and are connected to first and second crank pins 32A, 32B through first and second connecting rods 30A, 30B.

The V-type engine 2 has a banking angle "θ", which is defined by a first cylinder axis "A" of the cylinder bank 16A and a second cylinder axis "B" of the cylinder bank 16B, set at an angle of 60 degrees. Also, each of the four cylinders 26A, 26B is arranged in the cylinder banks 16A, 16B. That is, the V-type engine 2 comprises a 60-degree V8-cylinder engine.

As shown in FIG. 3, the cylinder heads 12A, 12B include: first and second intake ports 34A, 34B; first and second exhaust ports 36A, 36B; first and second intake valves 38A, 38B; first and second exhaust valves 40A, 40B; first and second intake camshafts 42A, 42B; and first and second exhaust camshafts 44A, 44B. The cylinders 26A, 26B are connected to the intake and exhaust ports 34, 36. The intake ports 34 are connected to first and second intake manifolds 48A, 48B extending from a surge tank 46.The exhaust ports 36 are connected to first and second exhaust manifolds 50A, 50B.

Now referring back to FIG. 1, the V-type engine 2 includes: a crank sprocket 52 at one end of the crankshaft 6 along the direction of the crankshaft axis "C"; first intake and exhaust cam sprockets 54A, 56A at one ends of the intake and exhaust camshafts 42A, 44A in a direction of the axis "C"; second intake and exhaust cam sprockets 54B, 56B at one ends of the intake and exhaust camshafts 42B, 44B in a direction of the axis "C"; and a first middle sprocket 58A at an outer end of the intake cam sprocket 54A of the intake camshaft 42A in a direction of the axis "C".

The second cylinder head 12A has an intermediate shaft 60 between the second intake and exhaust camshafts 42B, 44B, which shaft 60 is also between these camshafts and the crankshaft 6. The intermediate shaft 60 supports an integrated second intermediate sprocket 58B and an integrated second camshaft sprocket 62. The cylinder blocks 4 have an idler shaft 64 between the cylinder banks 16A, 16B and support an idler sprocket 66.

A timing chain 68 is trained over the crank sprocket 52, the intermediate sprockets 58A, 58B, and the idler sprocket 66. A first cam chain 70A is trained over the intake and exhaust cam sprockets 54A, 56A. A second cam chain 70B is trained over the intake and exhaust cam sprockets 54B, 56B and the camshaft sprocket 62.

The driving force of the crankshaft 6 is transmitted to the intake and exhaust camshafts 42A, 42B, 44A, 44B through the timing chain 68 and the cam chains 70A, 70B, and drives the intake and exhaust valves 38A, 38B, 40A, 40B to open/close the intake and exhaust ports 34A, 34B, 36A, 36B. Incidentally, the reference numeral 72 denotes a chain tensioner, and 74 a chain holder.

Also, the V-type engine 2 includes an oil pump 76 below the crankshaft supporter 24-1 at one end of the crankcase 8 in the direction of the crankshaft axis "C". A pump sprocket 80 is attached to a pump shaft 78. The crankshaft 6 is equipped with a sprocket 82 for auxiliary machinery inward from the crank sprocket 52. An auxiliary machinery chain 84 is trained over the pump sprocket 80 and the auxiliary machinery sprocket 84.

A balancer structure 86 for the V-type engine 2 has a balancer shaft 88 supported in parallel with the crankshaft 6. The balancer structure 86 includes the balancer shaft 88, a balancer journal 90, and a balancer weight 92. The balancer shaft 86 is supported directly below the crankshaft 6 so that the axis of shaft 88 is disposed in a longitudinally extending center plane "D" which passes through the crankshaft axis "C" and which divides (i.e. bisects) a banking angle "θ" as defined between the axes A and B of the respective cylinder banks 16A, 16B.

Referring to FIGS. 1 and 2, in the balancer structure of this embodiment, the crankshaft 6 is supported below the cylinder block 4 by the crankshaft supporters 24. Balancer shaft supporters 94 are integrally mounted below the crankshaft supporters 24 directly below the crankshaft 6 on the center plane "D".

In this balancer structure, the balancer shaft supporters 94 are integrally disposed respectively below the first, third, and fifth crankshaft supporters 24-1, 24-3, 24-5 of the crankshaft supporters 24-1 through 24-5. The balance shaft supporters 94 have balancer shaft caps 96 fitted by balancer mounting bolts 98, and have the balancer journals 90 for the balancer shaft 88 supported by the balancer shaft caps 96 through metal bearings 100.

The balancer shaft supporters 94 define therein oil passages 102 passing through the crankshaft supporters 24-1, 24-3, 24-5. The balancer journal 90 for the balancer shaft 88 is lubricated with oil lubricating the crank journals 20-1, 20-3, 20-5.

As shown in front view of the V-type engine 2 in FIG. 1, the balancer shaft 88 is positioned horizontally sidewardly adjacent and generally in line with the pump shaft 78 for the oil pump 76 as disposed below the crankshaft supporter 24-1. The balancer shaft 88 has a balancer sprocket 104 mounted at one end thereof by a mounting bolt 106.

The chain 84 for the auxiliary machinery is trained over the sprocket 82 on the crankshaft 6, the sprocket 80 on the pump shaft 78, and the sprocket 104 on the balancer shaft 88 through an idler sprocket 110 supported by an idler shaft 108 disposed below the crankshaft supporter 24-1. The balancer shaft 88 and the pump shaft 78 are communicated with the common auxiliary machinery chain 84.

This V-type engine 2 comprises a 60-degree V8-cylinder engine (i.e. angle θ equals 60 degrees), and unbalance inertial couple forces have primary ones, and the balancer shaft 88 rotates in reverse to the rotation of the crankshaft 6 of the engine. Accordingly, the number of teeth on the balancer sprocket 104 equals the number of teeth on the auxiliary machinery sprocket 82. The auxiliary machinery chain 84 is trained at the back thereof over the balancer sprocket 104.

Moreover, in the V-type engine 2, the block-side shaft supporters 22-1 through 22-5 supporting the crankshaft 6 are aligned along the crankshaft axis "C" in the lower part of the cylinder block 4. The first, third and fifth crankshaft supporters 24-1, 24-3, 24-5 corresponding to the block-side supporters 22 are integrally equipped with the balancer shaft supporters 94. The second and fourth crankshaft supporters 24-2, 24-4 are not equipped with balancer shaft supporters 94.

The balancer shaft 88 includes the balancer weights 92 mounted on the balancer shaft 88 at locations below the crankshaft supporters 24-2, 24-4 which do not have balancer shaft supporters 94 associated therewith.

Next, the operation of the above embodiment will be briefly described.

In the V-type combustion engine 2, the reciprocating motions of the pistons 28A, 28B are converted into the rotational motion of the crankshaft 6 through the connecting rods 30A, 30B. The rotational motion of the crankshaft 6 is transmitted to the balancer shaft 88 located below the crankshaft 6 but in a reverse rotational direction and at the same rotational speed through the auxiliary machine sprocket 82 and the auxiliary machinery chain 84 to the balancer sprocket 104.

The rotation of the balancer shaft 88 in the reverse direction but at the same speed as the crankshaft 6 cancels the inertial couple forces resulting in the vibration in the 60-degree V8-cylinder engine so as to reduce the vibration noise.

As thus described, in the balancer structure for the V-type engine 2, the balancer shaft supporters 94 are integrally mounted below the crankshaft supporters 24 directly below the crankshaft 6 on the center plane "D" which passes through the crankshaft axis "C" and which divides the bank angle "θ" between the cylinder banks 16A, 16B. As a result, the balancer shaft 88 can be positioned closer to the vibration-generating crankshaft 6 so as to shorten the distance between the crankshaft 6 and the balancer shaft 88.

Accordingly, the balancer structure 86 for the V-type engine 2 can have the balancer shaft 88 in closest proximity to the crankshaft, the latter being a source of vibration, so as to effectively cancel the inertial couple forces. Moreover, the balancer shaft supporters 94 are integrally mounted to the rigid crankshaft supporters 24 to effectively reduce the vibration.

Further, the balancer shaft 88 is supported by using the crankshaft supporters 24 which are conventional components of the V-type engine 2, so that the structure can be formed of fewer components to reduce weight. The distance between the crankshaft 6 and the balancer shaft 88 can be shortened, so that the balancer shaft 88 can be made smaller and lighter in proportion to that small distance, since the couple forces are proportional to the distance. As a result, the space for the balancer shaft 88 can be made smaller, which enables a compact and light V-type engine 2.

Still further, the balancer shaft 88 is generally sidewardly positioned horizontally in line with the pump shaft 78 for the oil pump 76 disposed below the crankshaft supporter 24-1 in front view. The balancer shaft 88 and the pump shaft 78 are communicated with the common auxiliary machinery chain 84, so that the balancer shaft 88 is aligned at generally the same level with the oil pump 76 in the oil pan 10. Accordingly, the disposition of the balancer shaft 88 does not require changes in the downward protuberant form of the oil pan 10. That is, the structures of the peripheral auxiliary machinery parts do not need to be changed.

As a result, the balancer structure 86 enables the space in the oil pan 10 to be effectively utilized to maximize the balancing effect.

In addition, in the balancer structure, a plurality of the crankshaft supporters 24-1 through 24-5 are provided correspondingly to the block-side supporters 22-1 through 22-5 in the lower part of the cylinder block 4. The first, third, and fifth crankshaft supporters 24-1, 24-3, 24-5 are integrally provided with the balancer shaft supporters 94. The balancer shaft 88 includes the balancer weights 92 on the balancer shaft 88 below the crankshaft supporters 24-2, 24-4 which do not have the balancer shaft supporter 94 thereon.

The balancer shaft 88 preferably has the heavier balancer weights 92 positioned as close as possible to the ends of the balancer shaft 88 to produce larger inertial couple forces. However, it is difficult to dispose such balancer weights 92, since crankshaft counterweights 112 are positioned in the vicinities of the crank journals 20-1, 20-5 at both ends of the crankshaft 6.

The balancer weights 92 need to be arranged as close as possible to the ends of the balancer shaft 88 while avoiding the crankshaft counterweights 112 largely protruding toward the crankshaft 6. For this purpose, the balancer weights 92 are disposed on the balancer shaft 88 below the second and fourth crankshaft supporters 24-2, 24-4 as described above to avoid the crankshaft counterweights 112. Consequently, this permits the balancer shaft 88 to be positioned directly below and not away from the crankshaft 6, and upwardly in the oil pan 10.

Accordingly, this balancer structure 86 can have the balancer shaft 88 disposed at a position where the effect of the balancer can be maximized while achieving a compact structure. Also, the oil in the oil pan 10 is not agitated, which prevents a reduction in the lubricating performance due to aeration.

Figure 4:
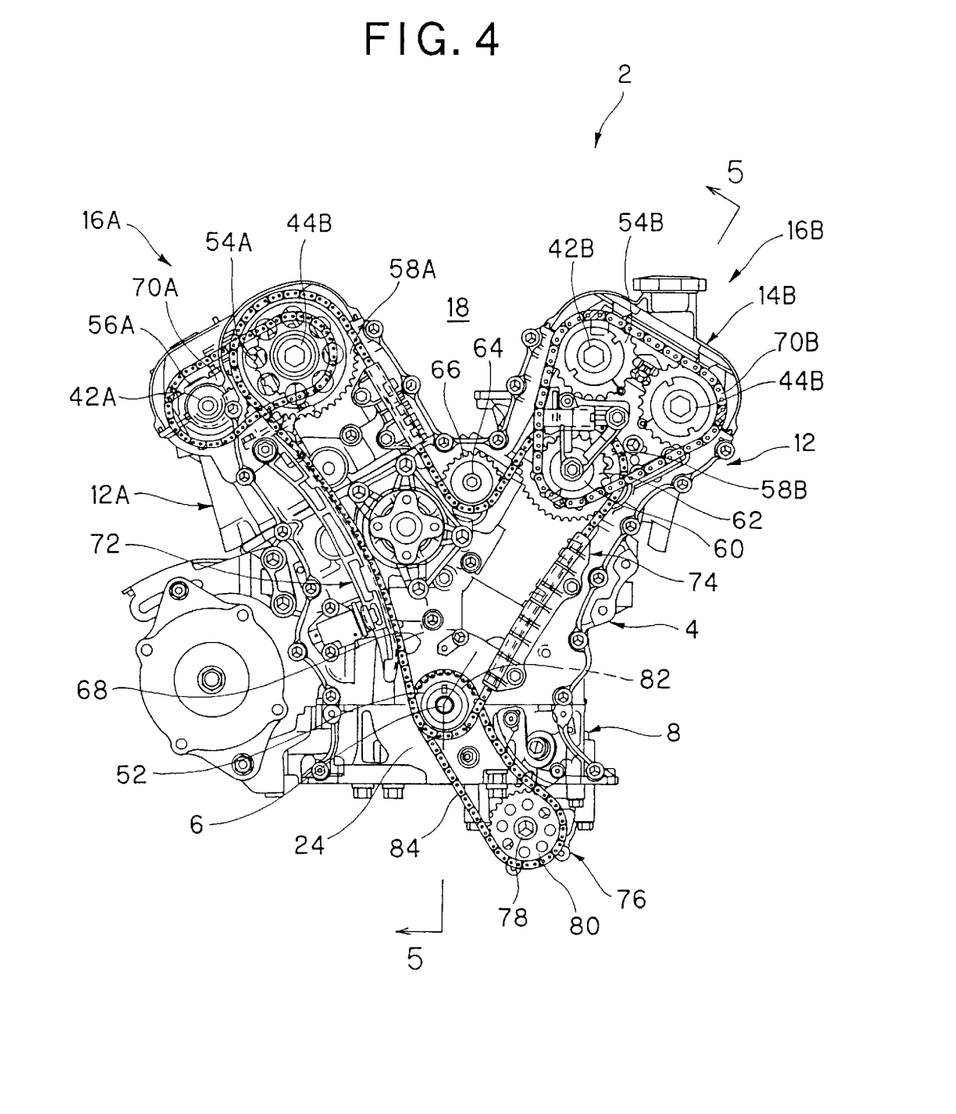
FIG. 4 is a front view of a 60-degree V6-cylinder engine.
Figure 5:
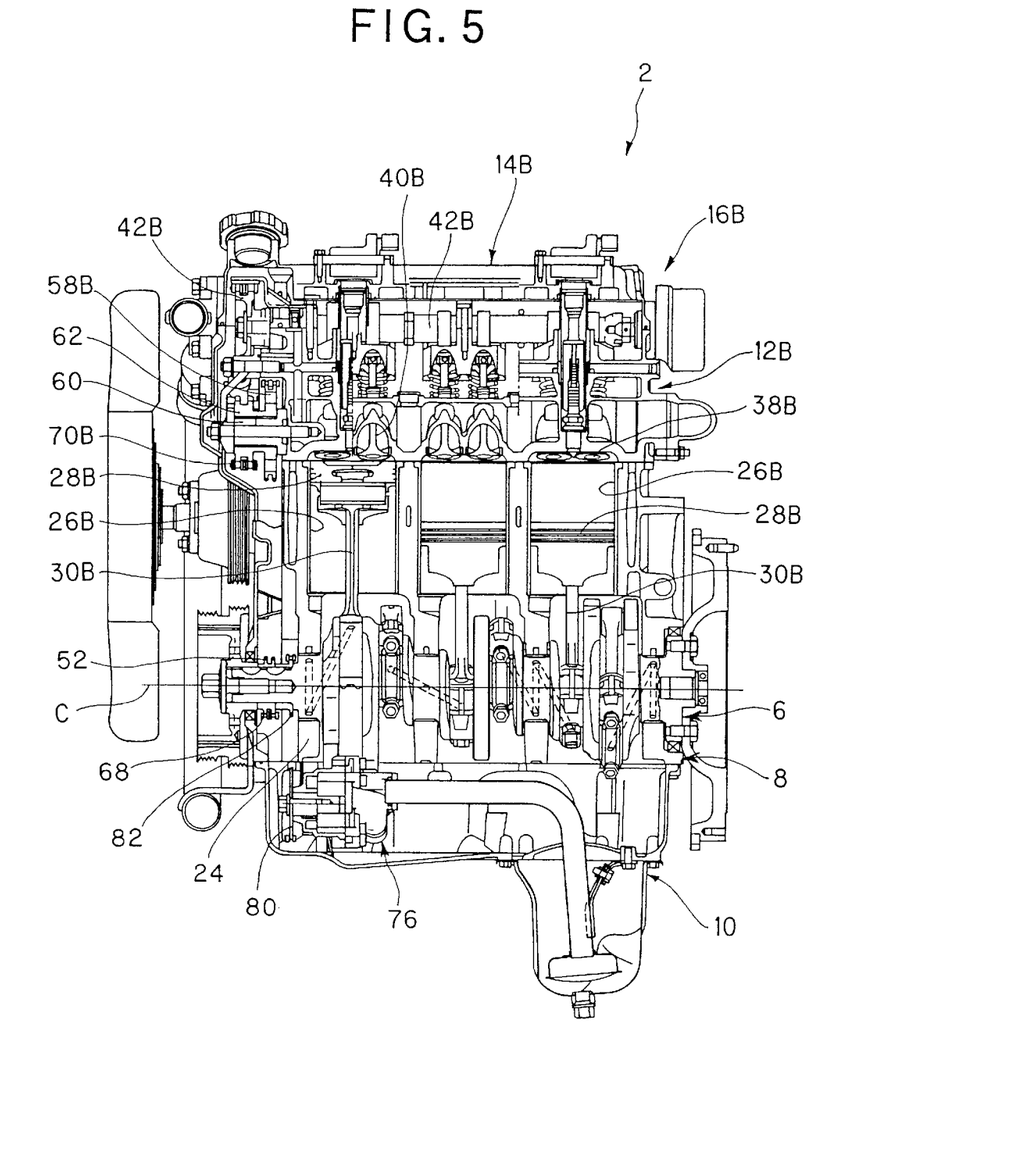
FIG. 5 is a cross-sectional view taken along line 5—5 of FIG. 4.

In addition, the balancer shaft 88 is in line with the pump shaft 78 for the oil pump 76 disposed below the crankshaft supporter 24-1. The balancer shaft 86 and the pump shaft 78 are communicated with the common auxiliary machinery chain 84, and the V-type engine 2 is formed as a 60-degree V8-engine. As a result, as shown in FIGS. 4 and 5, for a 60-degree V6-cylinder engine which does not require the balancer shaft 88, it is only required that the auxiliary machinery sprocket 82 and the pump sprocket 80 are communicated with the auxiliary machinery chain 84 after detachment of the balancer shaft 88 and the idler sprocket 110.

Accordingly, while using the components of the 60-degree V6-cylinder engine which does not require the balancer shaft 88, this balancer structure 86 of the present invention requires fewer changes to mount the balancer shaft 88. The 60-degree V8-cylinder engine is easily manufactured by commonly employing the components of the 60-degree V6-cylinder engine.

Moreover, the oil passages 102 passing through the crankshaft supporters 24-1, 24-3, 24-5 are thus formed in the balancer shaft supporters 94 which are integrally mounted below the crankshaft supporters 24-1, 24-3, 24-5. This allows the metal bearings 100 of the balancer shaft 86 to be lubricated with oil lubricating the crank journals 20-1, 20-3, 20-5. Forming of only the oil passages 102 provides easier construction of the lubricating system for the balancer shaft 88.

Incidentally, the balancer shaft supporters 94 are integrally mounted below the crankshaft supporters 24 in the crankcase 8 in this embodiment. However, the balancer shaft supporters 94 may be separated and attached to the crankcase 8 by the balancer mounting bolts 98 along with the balancer shaft caps 96.

Figure 6A:
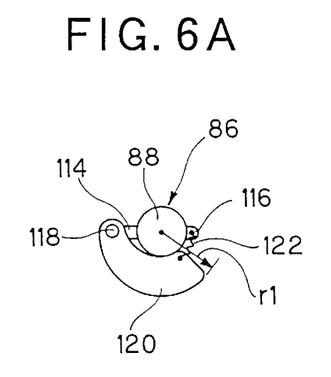
FIG. 6A illustrates an enlarged cross-sectional view of a balancer shaft during low speed operation.
Figure 6B:
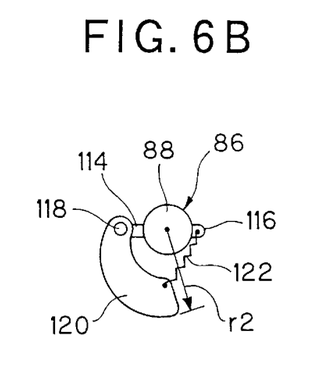
FIG. 6B illustrates an enlarged cross-sectional view of the balancer shaft during high speed operation.

FIGS. 6A–6B illustrate a second embodiment of the invention. In the balancer structure of the second embodiment, a pair of projections 114, 116 are protruded symmetrically in a radial direction of the balancer shaft 88. The balancer weight 120 is attached at one end thereof to the projection 114 by a pin 118, and at the other end thereof connected to the projection 116 through a spring 122.

As shown in FIG. 6A, during lower speed operation of the V-type engine 2, the balancer weight 120 is pulled toward the balancer shaft 88 under a tension by the spring 122, so that the weight 120 rotates within the smaller radius "r1". During higher speed operation of the V-type engine 2, as shown in FIG. 6B, the balancer weight 120 is spaced further away from the balancer shaft 88 by centrifugal force, so that the weight 120 rotates within the larger radius "r2".

Accordingly, the rotating radius of the balancer weight 120 can be changed according to the operation speed of the V-type engine 2. During high speed operation which generates vibration noise, the inertial couple forces produced by the balance weight 120 can be quadratic-curvedly increased compared to the lower speed operation, which reduces the inertial couple forces effectively to reduce vibration noise.

Figure 7A:
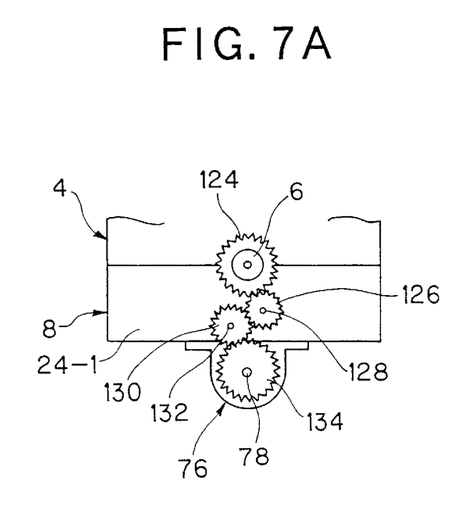
FIG. 7A illustrates a front view of a main part of the V-type engine.
Figure 7B:
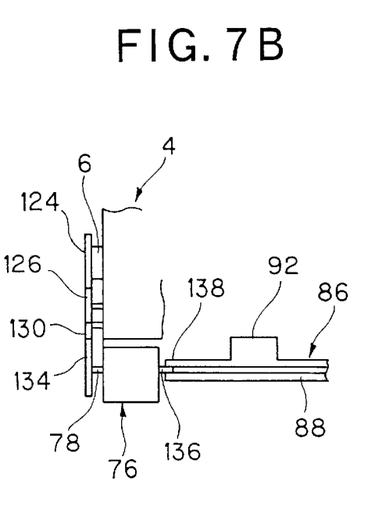
FIG. 7B illustrates a side view of a main part of the V-type engine.

FIGS. 7A–7B illustrate a third embodiment of the invention. The oil pump 76 is attached directly below the crankshaft 6 on the center plane "D" and below the bottom of the first crankshaft supporter 24-1 which is at one end of the crankcase 8 in a direction of the crankshaft axis "C". The center plane "D" passes through the crankshaft axis "C" of the crankshaft 6 and divides the banking angle "θ" between the cylinder banks 16A, 16B.

A gear 124 for the auxiliary machinery is mounted at one end of the crankshaft 6 in a direction of the crankshaft axis "C". The crankshaft supporter 24-1 includes a middle gear 126 to mesh with the gear 124 through a first middle shaft 128. A second middle gear 130 is supported by a middle shaft 132 to mesh with the gear 126. A gear 134 to mesh with the gear 130 is attached to one end of the pump shaft 78 of the oil pump 76 in a direction of the crankshaft axis "C". The auxiliary machinery gear 124 has the same number of teeth as that of the pump gear 134. The gear 126 has the same number of teeth as that of the middle gear 130.

A pump-side connection 136 is disposed at one end of the oil pump 76 in a crankshaft direction "C". A balancer-side connection 138 which is detachably attached to the connection 136 is disposed at one end of the balancer shaft 88 in a crankshaft direction "CC". The rotation of the crankshaft 6 is transmitted to the balancer shaft 86 by coupling of the connections 136, 138 through gears 124, 126, 130, 134 in a reverse rotational direction and at the same rotational speed.

The oil pump 76 is mounted below the crankshaft supporter 24-1 directly below the crankshaft 6 on the center plane "D" which passes through the crankshaft axis "C" of the crankshaft 6 and which divides the banking angle "θ" between the cylinder banks 16A, 16B. The crankshaft 6 is connected to the pump shaft 78 through the gears 124, 126, 130, 134. The balancer shaft 88 is connected to the pump shaft 78 of the oil pump 76 through the connections 136, 138 to comprise the 60-degree V8-cylinder engine with the balancer shaft 88. To constitute the 60-degree V6-cylinder which does not require the balancer shaft 88, it is only necessary to detach the balancer shaft 88, as shown in FIGS. 4, 5.

Accordingly, required changes to install the balancer shaft 88 can be minimized by commonly employing the components of the 60-degree V6-cylinder engine which does not require the balancer shaft 88. It is easier to manufacture the 60-degree V8-cylinder engine with the balancer shaft 88 by employing the components of the 60-degree V6-cylinder engine.

According to the present invention, in the structure of the V-type engine, the balancer shaft can be positioned closer to the crankshaft generating vibration to shorten the distance between the crankshaft and the balancer shaft.

Accordingly, the balancer structure for the V-type engine 2 can have the balancer shaft 88 in closest proximity to the crankshaft which is a source of vibration to effectively cancel the inertial couple forces. In addition, the distance between the crankshaft and the balancer shaft can thus be shortened, so that the balancer shaft 88 can be made smaller and lighter in proportion to that small distance, since the couple forces are proportional to the distance. As a result, the space for the balancer shaft 88 can be made smaller which enables a compact and light V-type engine 2.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A balancer structure for a V-type engine having a balancer shaft supported in parallel with a crankshaft of the V-type engine, the balancer shaft being positioned directly below the crankshaft and having a longitudinal axis positioned substantially in a center plane which divides cylinder banks of the V-type engine and which center plane passes through a longitudinal axis of the crankshaft, wherein an oil pump is offset sidewardly from and positioned generally below the crankshaft, and the balancer shaft and a pump shaft of the oil pump are drivingly connected with a common chain.

2. The balancer structure of claim 1, wherein the oil pump and the pump shaft are horizontally sidewardly offset from the crankshaft.

3. The balancer structure of claim 1 wherein a longitudinal axis of the pump shaft is sidewardly offset from the center plane which divides the cylinder banks.

4. The balancer structure of claim 1 wherein the V-type engine includes a V8-cylinder engine in which a 60-degree banking angle is defined between the cylinder banks, and wherein four cylinders are disposed in each cylinder bank.

5. A balancer structure for a V-type engine having a balancer shaft supported in parallel with a crankshaft of the V-type engine, the balancer shaft being positioned directly below the crankshaft and having a longitudinal axis positioned substantially in a center plane which divides cylinder banks of the V-type engine and which center plane passes through a longitudinal axis of the crankshaft, and the balancer shaft being disposed to rotate in an opposite direction from the crankshaft and at the same speed as the crankshaft.

6. The balancer structure of claim 5 wherein an oil pump including a pump shaft is offset sidewardly from and positioned generally below the crankshaft, and the balancer shaft and the pump shaft are drivingly connected to one another with a common chain.

7. The balancer structure of claim 5 wherein the rotation of the crankshaft is transmitted to the balancer shaft through a drive arrangement.

8. The balancer structure of claim 7 wherein the drive arrangement comprises a plurality of gears disposed to rotate the balancer shaft in a reverse rotational direction from the crankshaft, and an oil pump is disposed directly below the crankshaft and in the center plane which divides the cylinder banks.

9. The balancer structure of claim 7 wherein an oil pump including a pump shaft is disposed below the crankshaft and the longitudinal axis of the pump shaft is horizontally offset from the longitudinal axis of the crankshaft, the drive arrangement including a sprocket disposed on the crankshaft, a sprocket disposed on the pump shaft, a sprocket disposed on the balancer shaft, an idler sprocket, and a chain drivingly connected to the sprockets.

10. A balancer structure for a V-type engine having a balancer shaft supported in parallel with a crankshaft of the V-type engine, the V-type engine including a plurality of crankshaft supporters disposed to support the crankshaft adjacent a lower part of a cylinder block of the V-type engine, a plurality of balancer shaft supporters positioned directly below the crankshaft and on a center plane which divides cylinder banks of the V-type engine and which center plane passes through a longitudinal axis of the crankshaft, the balancer shaft being supported and mounted to the balancer shaft supporters by respective balancer shaft caps, the balancer shaft supporters being respectively mounted on only some of the crankshaft supporters, and a plurality of balancing weights disposed on the balancer shaft below respective crankshaft supporters not having balancer shaft supporters mounted thereon.

11. The balancer structure of claim 10 wherein the plurality of crankshaft supporters includes a plurality of block-side shaft supporters disposed in a lower end of the cylinder block and a plurality of lower shaft supporters respectively corresponding to said block-side shaft supporters and disposed in a crankcase located below the cylinder block, the balancer shaft supporters being mounted on only some of the respective lower shaft supporters, and the balancing weights being disposed below respective lower shaft supporters not mounting balancer shaft supporters thereon.

12. The balancer structure of claim 10 wherein an oil pump including a pump shaft is offset sidewardly from and positioned generally below the crankshaft, and the balancer shaft and the pump shaft are drivingly connected to one another with a common chain.

13. The balancer structure of claim 12 wherein the pump shaft is offset horizontally sidewardly from the crankshaft and the center plane which divides the cylinder banks of the V-type engine.

14. The balancer structure of claim 10 wherein the V-type engine includes a V8-cylinder engine in which a 60-degree banking angle is defined between the cylinder banks and wherein four cylinders are disposed in each cylinder bank.

15. A balancer structure for a V-type engine having a balancer shaft supported in parallel with a crankshaft of the V-type engine, wherein the crankshaft is supported by crankshaft supporters in a lower part of a cylinder block of the V-type engine, wherein a balancer shaft supporter is positioned directly below the crankshaft and on a center plane which divides cylinder banks of the V-type engine and which passes through a longitudinal axis of the crankshaft, the balancer shaft being supported and mounted to the balancer shaft supporter by a balancer shaft cap, and an oil pump which is offset sidewardly from and positioned generally below the crankshaft, the balancer shaft and a pump shaft of the oil pump being drivingly connected by a common chain.

16. The balancer structure of claim 15 wherein the V-type engine includes a V8-cylinder engine in which a 60-degree banking angle is defined between the cylinder banks and wherein four cylinders are disposed in each cylinder bank.

17. The balancer structure of claim 15 wherein the oil pump is offset horizontally sidewardly from the crankshaft.

* * * * *